INVENTORS
WALTER E. MILESTONE
BRENNAN B. WEST
THOMAS S. ROSS
ATTORNEY.

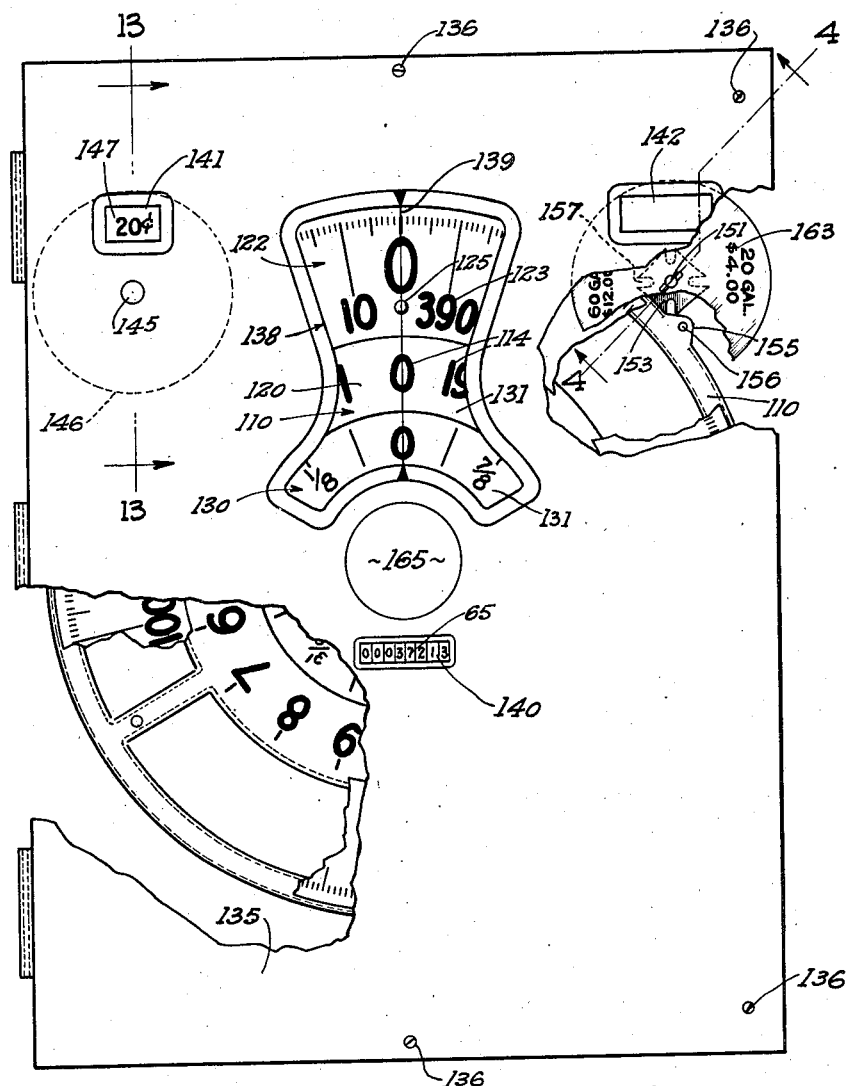
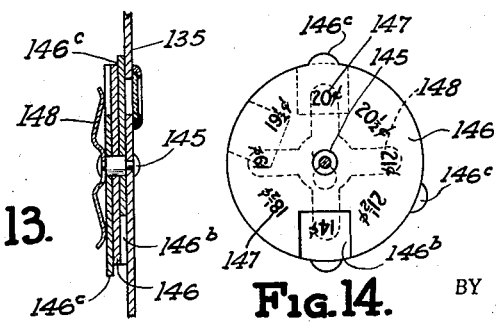
Fig. 13.  Fig. 14.  Fig. 2.
INVENTORS
WALTER E. MILESTONE
BRENNAN B. WEST
THOMAS S. ROSS
BY Hull, Brock & West
ATTORNEYS.

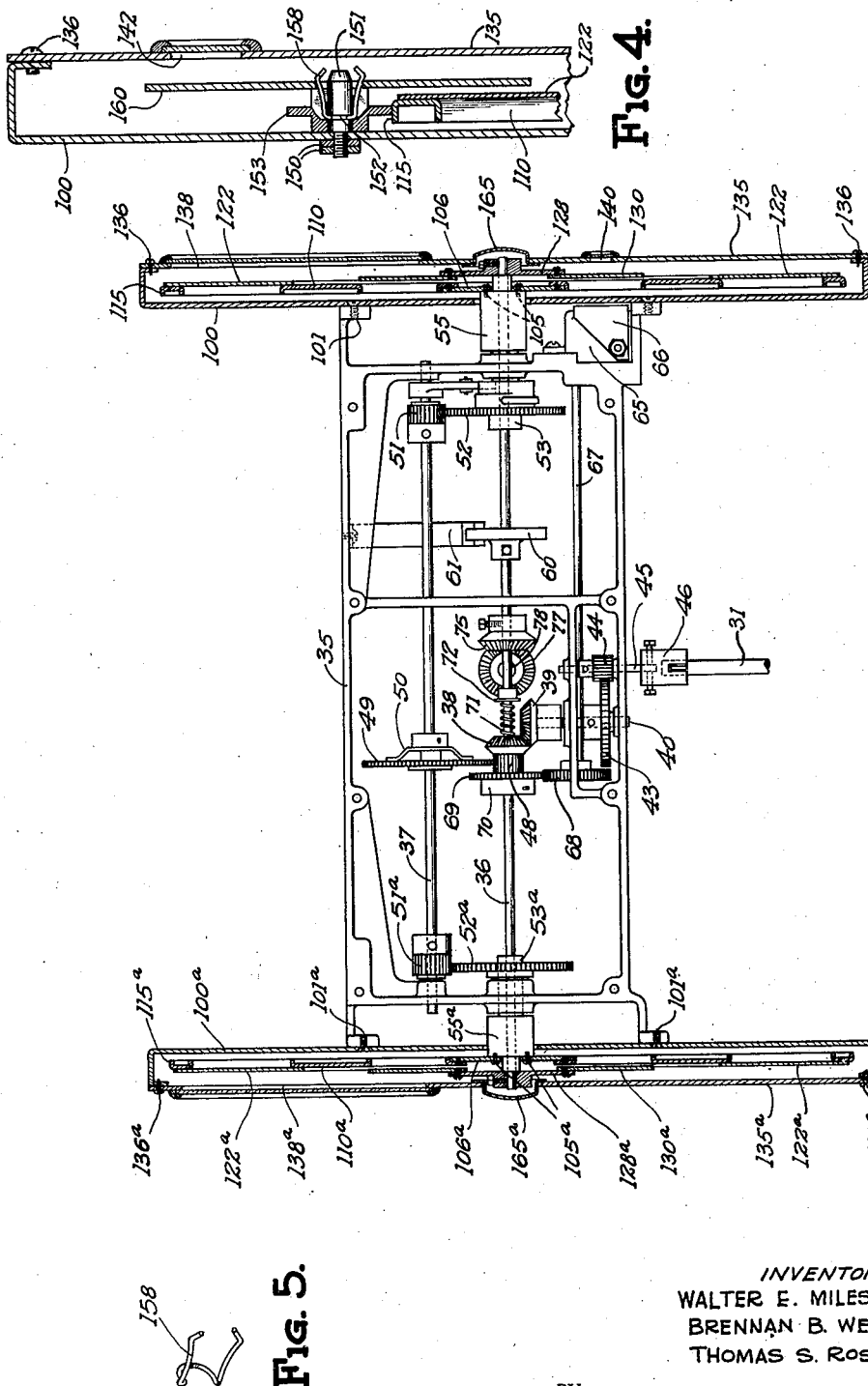

March 31, 1942. W. E. MILESTONE ET AL 2,278,145
INDICATING MECHANISM FOR LIQUID DISPENSING APPARATUS
Filed July 28, 1939 4 Sheets-Sheet 4

INVENTORS
WALTER E. MILESTONE
BRENNAN B. WEST
THOMAS S. ROSS
BY Hull, Brock & West
ATTORNEYS.

Patented Mar. 31, 1942

2,278,145

UNITED STATES PATENT OFFICE 2,278,145

INDICATING MECHANISM FOR LIQUID DISPENSING APPARATUS

Walter E. Milestone, Lakewood, Brennan B. West, Cleveland, and Thomas S. Ross, Cleveland Heights, Ohio; said West and said Ross assignors to said Milestone Application July 28, 1939, Serial No. 287,104

2 Claims. (Cl. 40—70)

This invention relates to improvements in indicating mechanisms of the class used in connection with liquid measuring and dispensing apparatus, particularly gasoline metering pumps for showing the quantity of liquid dispensed and the cost of such quantity to the purchaser.

Among the more general objects of the invention are the attainment of simplicity, reliability, and economy of production and maintenance in indicating mechanisms of the class above referred to.

Another object is to provide inexpensive, interchangeable cost indicating elements that may be easily and quickly removed and installed to take care of price changes in the liquid, and that cooperate in such manner with the quantity indicating means as to insure against errors.

A further object is to provide means for indicating the price per unit of measurement that consists of a series of superposed disks or dials that are so designed and cooperate in such manner as to greatly increase the capacity or price range of said means.

A still further object is to provide means by which an indicator of the so-called "clock" type may be cheaply and readily converted into a computer.

Figure 1:
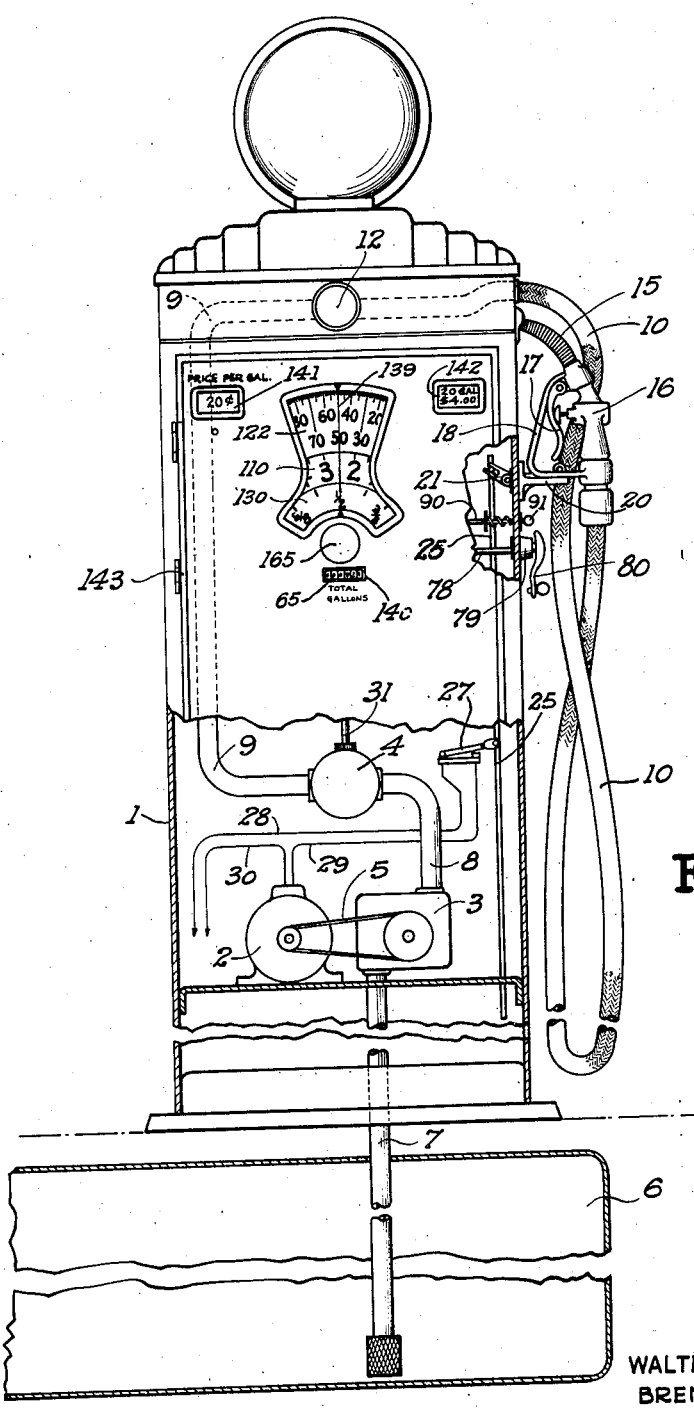
Figure 6:
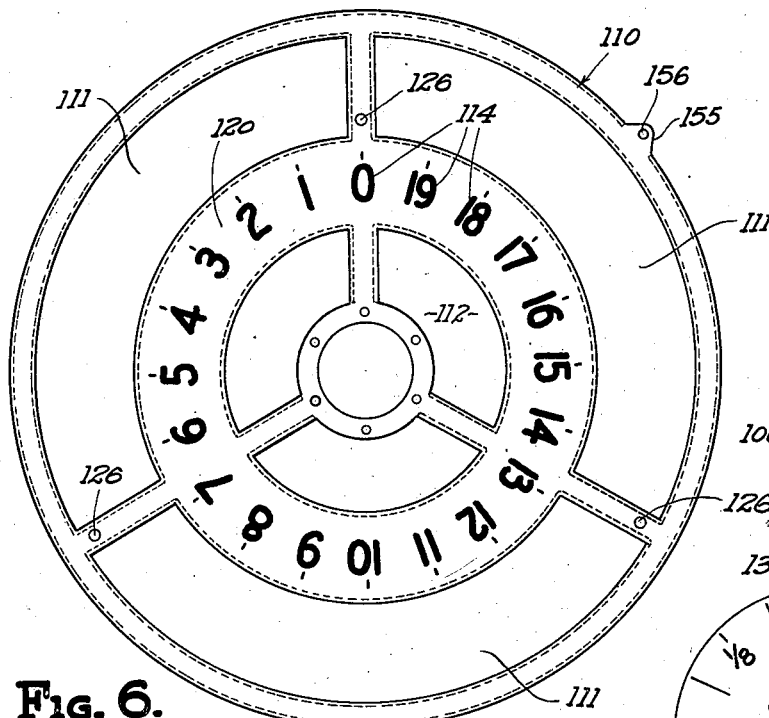
Figure 8:
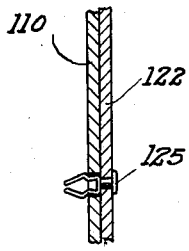
Figure 9:
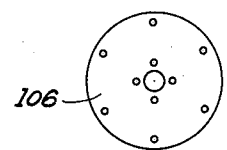
Figure 10:
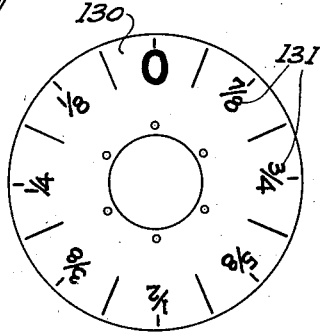
Figure 7:
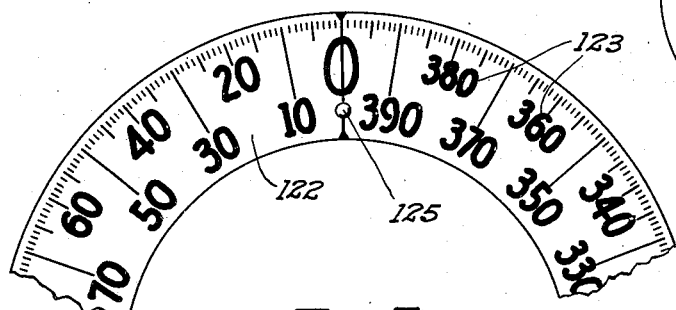
Figure 11:
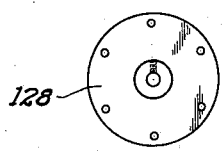
Figure 12:
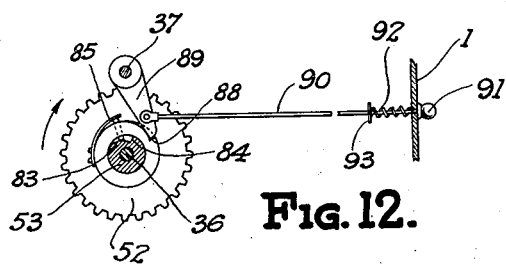

These objects, with others hereinafter appearing, are attained in the embodiment of the invention illustrated in the accompanying drawings wherein Fig. 1 is a front elevation of a liquid measuring and dispensing apparatus incorporating the invention; Fig. 2 is an enlarged front elevation of the indicating mechanism, certain parts being broken away; Fig. 3 is a sectional side elevation of the indicating mechanism, showing the driving connection between the same and the meter shaft; Fig. 4 is a sectional detail on the line 4—4 of Fig. 2; Fig. 5 is a perspective view of one of the elements of the mechanism shown in Fig. 4; Fig. 6 is a face view of the disk that bears the quantity indicia; Fig. 7 is a fragmentary face view of the detachable ring or chart that bears the price indicia; Fig. 8 is an enlarged sectional detail showing a type of fastening means by which the ring or chart may be detachably connected by a snap-on action to the disk; Fig. 9 is a face view of the adapter through which the disk shown in Fig. 6 is attached to the shaft of one of the prevailing types of liquid measuring and dispensing apparatus; Fig. 10 is a face view of the disk bearing the indicia of the fractions of the unit of measurement, in the present instance, the fractions of a gallon; Fig. 11 is a similar view of the adapter through which the disk of Fig. 10 is connected to the shaft of a given type of apparatus; Fig. 12 is a detail of the stop release of the set-to-zero mechanism; Fig. 13 is a section on the line 13—13 of Fig. 2 through the price per unit indicator, and Fig. 14 is a front view of the same with the face plate removed and the pivot member in section.

Because the invention is especially intended and peculiarly suited for incorporation in pumps of the class used at service stations for measuring and dispensing gasoline, it is so disclosed herein, although it is to be understood that our improvements are not restricted to association with any particular kind of liquid measuring and dispensing apparatus further than one involving a meter driven power transmitting element or shaft. Such an apparatus is shown in Fig. 1.

Housed in the lower portion of the casing 1 of the apparatus are an electric motor 2, a pump 3 and a meter 4. The pump is driven by the electric motor through a belt 5 engaged over pulleys on the shafts of the pump and motor, and the intake side of the pump communicates with the customary subterranean tank 6 through a conduit 7. The outlet side of the pump has connection, through a conduit 8, with the inlet of the meter 4. Connected to the output of the meter is a conduit 9 that ultimately leads to a hose 10 that hangs outside the casing.

A nozzle 15 is connected to the free end of the hose and includes a valve 16 biased toward closed position and adapted to be opened by a trigger 17 enclosed by a guard 18. When the hose is not in use the nozzle 15 is supported by a bracket 20 that projects from the side of the casing, all of which is in accordance with common practice, the parts including means by which they may be padlocked in the position shown. Associated with the bracket 20 is a lever 21, pivotally supported adjacent the inner end of the bracket. Said lever extends through an opening in the side of the casing 1 and has its inner end pivotally connected to a rod 25. 27 is the motor switch, shown conventionally as a knife switch, whose operating handle is connected to the rod 25, the switch being open when the rod is held elevated by reason of the outer end of the lever 21 being depressed. Said switch, with the motor 2 and a suitable source of electrical energy (not shown), is included in a circuit represented by conductors 28, 29 and 30. When the nozzle 15 is removed from the bracket 20, it is necessary for the operator to manually lift the outer end of the lever 21 to close the switch 27 and start the motor.

Suitably supported within the top portion of the casing 1 is a housing designated 35 in Fig. 3 within which are journaled parallel shafts 36 and 37. Mounted on the shaft 36 is a bevel pinion 38 that meshes with a similar pinion 39, fastened to the upper end of a vertical shaft 40 that is journaled within the housing 35. To the lower end of the shaft 40 is fastened a spur gear 43 that meshes with a pinion 44 secured to a spindle 45 that is journaled in the housing and extends an appreciable distance below the same where it has driving connection, through a coupling 46, with the upper end of a power transmitting element 31 that is driven by the meter 4, such element being shown as the shaft of said meter.

Mounted on the shaft 36 alongside the bevel pinion 38 and suitably held against rotation with respect to said pinion is a spur pinion 48 that meshes with a spur gear 49 rotatably mounted on the shaft 37 but normally held against turning with respect to said shaft by friction means designated generally by the numeral 50. Fastened to the shaft 37 near its opposite ends are pinions 51 and 51a that mesh, respectively, with gears 52 and 52a on the inner ends of hollow shafts 53, 53a that are journaled in bearings in the ends of the housing 35, the gear 52a being secured to the shaft 53a. The connection between gear 52 and shaft 53 is of such character that the gear will drive said shaft when rotated in the direction in which it turns during a liquid dispensing operation. This connection is of a ratchet nature and is a part of the set-to-zero feature which will presently be described. Fastened to the hollow shafts or sleeves 53, 53a, outwardly beyond the bearings in which they are journaled, are cylindrical heads 55, 55a. Retarding means for the shaft 36 is provided by a disk 60 that is fastened to the shaft and with the edge of which engages a leaf spring 61 that is fastened to and depends from the top of the housing 35, the edge of the disk 60 being provided with a notch into which a nose on the spring 61 engages when the parts are in normal position, this being a common expedient in such mechanisms wherefore it is deemed unnecessary to further illustrate or describe it.

The customary totalizer 65 is included in the indicating mechanism, the same consisting of a counter of common form equipped with a shutter 66 and operated by a shaft 67 that is journaled within the housing 35 and has fastened to its end remote from the counter a gear 68 that meshes with a gear 69 mounted upon the shaft 36 alongside the previously mentioned spur pinion 48 and suitably held against turning with respect thereto. In practice, the gear 69, spur pinion 48 and bevel pinion 38 may be die cast or otherwise made as an integral unit. The unit comprising these parts, integral in effect if not actually so, is frictionally engaged with a collar 70 that is fastened to the shaft 36. The unit is urged in the direction of said collar by a spring 71 that surrounds the shaft 36 and is compressed between the pinion 38 and an abutment 72 that is fixed to the shaft. The slip connection thus provided between the gear 69 and the shaft 36 allows for reverse movement of said shaft during the set-to-zero operation without affecting the totalizer 65 or the driving connections between the meter shaft 31 and the indicating mechanism. It will be understood that the purpose of the totalizer is to show the total quantity of liquid dispensing over a given period of time.

The set-to-zero mechanism includes a bevel pinion 75 that is fastened to the shaft 36 and meshes with a similar pinion 77 on a shaft 78 that is disposed in the plane of and at right angles to the shaft 36 and is rotatably supported adjacent its inner end in the housing 35 and near its outer end in a bearing 79 supported by the side wall of the casing 1. An operating handle or crank 80 is fastened to the outer end of the shaft 78 and by means of it, through the connections described, the shaft 36 may be rotated in a direction opposite that in which it rotates during a liquid dispensing operation. Means associated with the gear 52, and illustrated in detail in Fig. 12, forms a part of the set-to-zero mechanism. As shown in Fig. 12, the hollow shaft 53 on which gear 52 is mounted has a peripheral notch defined by a spiral wall 83 and a radial shoulder 84. Extending radially through the hub of the gear 52 is a spring pressed plunger 85 for engagement with the shoulder 84. Out of the circumferential path of the spring pressed plunger 85, the hub of the gear 52 is provided with a peripheral notch, similar to that of the hollow shaft 53, the notch being of a shape to provide a radial shoulder 88. The shoulder 88 is in the path of a stop 89, said stop being in the nature of a pawl that is pivoted on the shaft 37. Connected to the stop 89 near the free end thereof is a rod 90 that extends out through an opening in the side wall of the casing 1 where it is equipped with an operating handle or knob 91. The rod is urged inwardly by a spring 92 that surrounds the rod and is compressed between the casing wall and an abutment 93 on the rod.

The mechanism above described is more or less standard and is similar to that incorporated in many liquid measuring and dispensing apparatus that are in general use and that ordinarily incorporate hands that are connected to the ends of the shaft 36 and the hollow shafts 53 and are therefore sometimes referred to as "clock type indicators." Dials are customarily supported inwardly of said hands by the ends of a housing similar to that designated 35 in Fig. 3. In our invention, shallow pan-like casings 100 and 100a replace the dials and are fastened, as by screws 101, 101a to the opposite ends of the housing 35. The apparatus selected for illustrative purposes has indicating means in both its front and rear sides, and inasmuch as the parts associated with the two sides are identical we shall describe by the use of reference numerals the indicating means disposed adjacent the front of the apparatus and designate the corresponding parts of the means located at the rear by the same reference numerals augmented by the exponent a. One difference, however, is to be noted although deemed unnecessary of illustration. Because of the fact that the parts rotate the same way at both ends of the indicating mechanism and are viewed from opposite directions, the arrangement of the indicia on the movable indicator parts at the rear are reversed with respect to those at the front.

Fastened, as by screws 105 to the outer end of the head 55 is an adapter 106, shown in detail in Fig. 9; and to the peripheral portion of the adapter is suitably secured, as by rivets, a disk-like member 110. This member is desirably die stamped or otherwise made from relatively thin, light metal, such as aluminum, and to reduce the weight of the member to the minimum, segmental openings 111 are formed therein adjacent the edge of the member while other similar openings 112 are formed near its center. Between the two circumferential series of openings is a band of metal on which are printed quantity indicia 114. The disk-like member is provided with a peripheral flange 115, and to impart rigidity to its body portion, the member is flanged about the openings 111 and 112. The openings 112 have a second purpose as will presently appear.

It may be well to explain at this time that the reason for including the adapter 106, as well as the adapter shown in Fig. 11, is to enable clock type indicators that are now on the market to be quickly and economically converted into computers by incorporating therein the indicating means of our invention. The adapters are made to fit the shafts of different prevailing indicators of the clock type, and all are designed to receive the indicating elements of our invention wherefore all parts of our indicating mechanism, excepting the adapters are standard. In case the apparatus is especially designed and constructed for incorporation of our mechanism, the adapters may be omitted and the indicator elements directly attached to the shafts.

According to the present embodiment of our invention, the quantity indicia 114, as above stated, are printed or otherwise permanently applied to a metal band 120 of the member 110 between the outer and inner series of segmental openings 111 and 112. Attached to the portion of the disk-like member 110, outwardly beyond the series of indicia 114, is an annular chart or ring 122 to which is applied, as by printing, the price indicia 123. This chart or ring is desirably detachable from the member 110 so that one may be quickly and conveniently substituted for another in the event of price change. In order to reduce the number of charts or rings necessary to cover a given range of prices, as well as to promote economy, the same may be printed on both sides with different prices and reversed when occasion requires.

In the illustrated embodiment of the invention, the series of quantity indicia embraces twenty units—as twenty gallons; and the series of price indicia is based on a price per unit of quantity— as a gallon—of twenty cents. The chart or ring 122 may be made of light material, such as aluminum, Celluloid, or a tough quality of paper or cardboard, and is provided with snap fasteners, one of which is shown at 125 in Figs. 6 and 8, that are adapted to be engaged through holes 126 in the spoke-like parts of the member 110 between the segmental openings 111. It will be observed that one of the holes 126 is differently spaced from the center of the disk-like member 110 from the others, and the fasteners 125 are similarly arranged on the chart or ring 122, wherefore proper positioning of the chart or ring upon the member 110 is assured. If the charts or rings are printed on both sides, the fasteners 125 may be reversed and secured to the member 110 and expand within openings of the chart or ring, a mere reversal of the arrangement illustrated in the drawings.

Fastened to the shaft 36, where the latter protrudes beyond the end of the hollow shaft 53, is an adapter 128 (Fig. 11) that carries a disk 130, desirably made of a suitable transparent material, such as Celluloid. The disk 130 bears indicia 131 that represents the parts or fractions of a unit of quantity, as the fractions of a gallon. In the embodiment shown, the shaft 36 and the hollow shafts 53, 53a are geared together in the ratio of twenty to one which means that every time the hollow shaft that carries the disk-like member 110 or 110a makes a twentieth of a rotation so as to move a distance equivalent to the space between the adjacent quantity indicia, the shaft 36 that carries the disks 130 and 130a makes one complete rotation.

The reason for making the disk 130 of transparent material, and the reason additional to the one already mentioned for including the segmental openings 112 in the member 110, are to reveal the totalizer 65.

Disposed across the front of the respective casings 100, 100a are face plates 135, 135a, shown as hinged at one side to the casings and held elsewhere thereto by screws 136, 136a. Confining our description to the face plate on the front side of the apparatus (and which is duplicated at the rear where the corresponding elements are indicated by the same reference numerals plus the exponent $a$) said face plate is provided with a window 138, desirably covered by a pane of glass or other suitable transparent material. Extending vertically across the window is an index 139 which may consist of a wire or other suitable element attached at its ends to the face plate, or it may be a mark inscribed on the aforesaid pane. The window is of sufficient vertical extent to reveal practically the full width of the chart or ring 122, the quantity indicia 114, and the fraction indicia 131; and it is sufficiently wide to embrace several of the price, quantity and fraction indicia of the respective series. The face plate is also provided with an opening 140 through which the totalizer 65 may be observed, and with openings 141 and 142, the purposes of which will presently be explained. These openings also may be covered by panes of glass or other suitable transparent material. In lieu of individual panes for the window 138 and the several openings, a pane large enough to cover the opening in the casing 1 through which the indicator is observed may be employed, and it may be held in place in any approved manner across said opening, the opening being surrounded by the frame or bezel 143 (Fig. 1).

Rotatably supported adjacent the inner side of the face plate 135 on a pivot member 145 that projects inwardly from said plate are dials 146, each bearing an annular series of indications 147 designating, respectively, different prices per unit of measurement of the liquid as, for example, different prices per gallon of gasoline. The indications are observable through the opening 141. By providing a number of dials instead of but one, each with a notch or the like 146b through which any selected indication of an underneath dial may be aligned with the opening 141, the capacity of the price indicating means is greatly increased, and this may be doubled by printing the dials on both sides. The dials are frictionally held in place by a spring pressure member 148 that buttons over the inner headed end of the pivot member 145 so that the pressure member 148 may be removed and the dials reversed or other dials bearing different prices substituted for the one shown. To facilitate turning or setting of the dials, each is provided with a peripheral lug 146c.

Mounted within the casing 100 rearwardly of the opening 142 is mechanism detailed in Figs.

4 and 5 and which will now be described. Clamped by nuts 150 within an aperture in the rear wall of the casing 100, is the threaded shank of a stud 151 having an annular groove 152. Rotatably mounted upon the stud 151 is an element 153 of a Geneva stop movement, the same bearing at its edge on the peripheral flange 115 of the disk-like member 110. The flange 115 is interrupted at one point in its circumference, such point being adjacent the right hand side of the element 153 when the parts are in normal position and as viewed in Fig. 2; and carried by a lug 155 of the member 110 is a pin 156 that is arranged for cooperation with the radial notches 157 in the element 153, four such notches, equally spaced about the element, being shown. The element is held on the stud 151 by a spring wire member 158, shown in perspective in Fig. 5, a part of which is engaged in the groove 152. Applied to the stud beyond the outer end of the element 153 is a dial 160 that is held on the stud by the flared ends of the member 158 which serves also to hold the dial against turning with respect to the element 153, said element having diametrically opposed kerfs that accommodate the legs of the member 158. The dial 160, like the chart or ring 122, is printed on both sides with different prices and is reversible.

It is evident that each time the member 110 is rotated, the element 153 and consequently the dial 160 will be given a quarter turn; and arranged on the dial for display through the opening 142 are indications 163. When the dial is in normal position, a zero indication or blank space thereon is exposed through the opening 142, and each time the member 110 is given a complete rotation, an indication shows through the opening 142 which in the present embodiment, designates the number of gallons that have been dispensed upon a complete rotation of such member, and the cost thereof to the purchaser, as will more fully appear hereinafter.

As shown herein, the face plates 135 and 135ª are provided with central apertures that are normally closed by thimbles 165, 165ª. These thimbles are omitted when the indicator parts are installed in apparatus having the well known central knob type of set-to-zero mechanism.

In considering the operation of the indicating mechanism, it may be assumed that the mechanism is incorporated in a gasoline metering pump of a service station and that the nozzle 115 has been placed in the filling spout of a gasoline tank. The pump is put in motion as a result of pressing the trigger 17 in the usual way to dispense the gasoline, and immediately the member 110 and disk 130 start to rotate, indicating, respectively the number and price, and the fractions, of gallons dispensed, the reading being made of the indicia registering with the index 139. If the sale is made on the gallonage basis, the operator may watch the fraction disk and stop at the exact quantity desired, and wherever he stops the cost to the purchaser of such quantity will be designated by the price indication registering with the index 139. On the other hand, if the sale is made on the total cost basis, the operator watches only the price indicia and stops when the designated amount is reached; or, again, when the tank is filled at the request of the customer, the operator need consult only the price indicia.

In case of a sale of a quantity greater than that represented by a complete rotation of the member 110, the total amount as to both quantity and price may be ascertained by adding to the amount indicated, that appearing through the opening 142, it being understood that each time the member 110 makes a complete rotation it will turn the dial 160 to reveal, through the opening 142, the amount represented by the previous rotation of said member 110.

To set the mechanism to zero—and assuming that less than a complete rotation of the member 110 has been made—the operator simply turns the handle 80 to reset to zero the member 110 and the disk 130, this being accomplished in the manner already described. In the event that the member 110 has exceeded a complete rotation and has stepped up the dial 160, the knob 91 is grasped and the rod 90 drawn outwardly against the tension of the spring 92 thereby to retract the stop 89 from effective position. The handle 80 is then turned while the stop is held retracted until the opening 142 is cleared—that is, shows blank or zero—after which, continuing to turn the handle 80, the knob may be released to permit the stop to resume effective position, thereby to arrest movement of the member 110 and disk 130 when both reach zero position.

In the event of a price change, the indicating mechanism is reconditioned in accordance with such change by removing the screws 136, 136ª, swinging the face plates 135 and 135ª open; removing the dials 160 and 160ª and the charts or rings 122 and 122ª, reversing them or substituting others for them to the end that the proper indicia be displayed; resetting the price dials 146, 146ª, and then closing and fastening the face plates.

Having thus described our invention, what we claim is:

1. Indicating mechanism for a register for use with a commodity dispensing apparatus, said indicating mechanism comprising a rotatable member bearing a series of quantity indicia up to a given amount, and a series of price indicia up to a corresponding sum, and an element associated with said member and movable a given distance at each rotation of the member and bearing indications designating the quantity and price of the commodity dispensed upon successive rotations of the member.

2. Indicating mechanism for a register for use with a commodity dispensing apparatus, said mechanism comprising a rotatable disk-like member driven by the meter and bearing an annular series of quantity indicia, a chart detachably connected to said member and bearing an annular series of price indicia disposed in an invariable relation to the quantity indicia, and a dial movably supported in a given position with respect to said member, said dial being movable a given distance for each rotation of the disk-like member, said dial bearing indications designating the quantity and price of the commodity dispensed upon each rotation of the disk-like member.

WALTER E. MILESTONE.
BRENNAN B. WEST.
THOMAS S. ROSS.